US010009831B2

(12) United States Patent
Vos

(10) Patent No.: US 10,009,831 B2
(45) Date of Patent: Jun. 26, 2018

(54) METHOD AND APPARATUS FOR COMMUNICATION OF SYSTEM INFORMATION IN A WIRELESS SYSTEM

(71) Applicant: SIERRA WIRELESS, INC., Richmond (CA)

(72) Inventor: Gustav Gerald Vos, Surrey (CA)

(73) Assignee: Sierra Wireless, Inc., Richmond, British Columbia (CA)

( * ) Notice: Subject to any disclaimer, the term of this patent is extended or adjusted under 35 U.S.C. 154(b) by 296 days.

(21) Appl. No.: 14/262,433

(22) Filed: Apr. 25, 2014

(65) Prior Publication Data

US 2014/0334372 A1 Nov. 13, 2014

Related U.S. Application Data

(60) Provisional application No. 61/821,954, filed on May 10, 2013.

(51) Int. Cl.
*H04W 48/10* (2009.01)
*H04W 72/04* (2009.01)

(52) U.S. Cl.
CPC .......... *H04W 48/10* (2013.01); *H04W 72/042* (2013.01)

(58) Field of Classification Search
CPC ... H04W 48/10; H04W 72/042; H04W 48/12; H04W 72/0406; H04W 24/02;
(Continued)

(56) References Cited

U.S. PATENT DOCUMENTS 5,732,348 A 3/1998 Norimatsu
6,188,911 B1 2/2001 Wallentin et al.
(Continued)

FOREIGN PATENT DOCUMENTS

CA 2710158 A1 7/2009
CN 101300767 A 11/2008
(Continued)

OTHER PUBLICATIONS

"3rd Generation Partnership Project; Technical Specification Group Services and System Aspects; Study on Facilitating Machine to Machine Communication in 3GPP Systems; (Release 8)," 3rd Generation Partnership Project, 3GPP TR 22.868 V8.0.0, Mar. 2007; 15 pages.
(Continued)

*Primary Examiner* — Paul H Masur
*Assistant Examiner* — Michael Phillips
(74) *Attorney, Agent, or Firm* — Perkins Coie LLP

(57) ABSTRACT

A method and apparatus for communicating system information, such as SIBs, from a base station to a terminal in a wireless network such as an LTE network. The base station is configured to broadcast the system information in accordance with a standard which defines a range of allowable values for characteristics of the broadcast. A restricted range of values for the characteristics is defined as a strict subset of the range of allowable values, and repeated broadcasts of the system information are configured in accordance with the restricted range of values. The terminal uses knowledge of the restricted range of values to facilitate reception of multiple repetitions of the broadcast. The terminal then combines the multiple repetitions to facilitate recovery of the system information.

13 Claims, 5 Drawing Sheets

(58) Field of Classification Search
CPC ............... H04W 48/16; H04W 72/005; H04W 72/0446; H04W 72/1289; H04W 72/048; Y04S 40/126; Y02E 60/7853; H04L 5/0053; H04L 1/1861; H04L 5/0091; H04L 5/0096
See application file for complete search history.

(56) References Cited

U.S. PATENT DOCUMENTS

| | | | |
|---|---|---|---|
| 8,345,588 B2* | 1/2013 | Adachi | H04W 72/0453 370/315 |
| 9,219,994 B2* | 12/2015 | Park | H04W 4/06 |
| 2004/0258014 A1 | 12/2004 | Ro et al. | |
| 2005/0286547 A1 | 12/2005 | Baum et al. | |
| 2006/0215588 A1 | 9/2006 | Yoon | |
| 2007/0098098 A1 | 5/2007 | Xiao et al. | |
| 2007/0171864 A1 | 7/2007 | Zhang et al. | |
| 2008/0013599 A1 | 1/2008 | Malladi | |
| 2008/0086669 A1 | 4/2008 | Cheng et al. | |
| 2008/0170526 A1* | 7/2008 | Narang | H04W 52/0216 370/311 |
| 2008/0268785 A1 | 10/2008 | McCoy et al. | |
| 2009/0067531 A1 | 3/2009 | Lee et al. | |
| 2009/0175226 A1 | 7/2009 | Ren et al. | |
| 2009/0176490 A1* | 7/2009 | Kazmi | H04J 11/0093 455/434 |
| 2009/0204863 A1 | 8/2009 | Kim et al. | |
| 2009/0221293 A1 | 9/2009 | Petrovic et al. | |
| 2009/0280823 A1 | 11/2009 | Petrovic et al. | |
| 2010/0008310 A1 | 1/2010 | Gerstenberger et al. | |
| 2010/0027492 A1 | 2/2010 | Asanuma | |
| 2010/0074130 A1* | 3/2010 | Bertrand | H04L 1/0007 370/252 |
| 2010/0302106 A1 | 12/2010 | Knudsen | |
| 2010/0329159 A1 | 12/2010 | Xia | |
| 2011/0034198 A1 | 2/2011 | Chen et al. | |
| 2011/0164532 A1 | 7/2011 | Kawamura et al. | |
| 2011/0194510 A1 | 8/2011 | Gaal et al. | |
| 2011/0205982 A1* | 8/2011 | Yoo | H04L 1/0038 370/329 |
| 2011/0222525 A1 | 9/2011 | Kishigami et al. | |
| 2011/0223958 A1 | 9/2011 | Chen et al. | |
| 2011/0228883 A1* | 9/2011 | Liu | H04L 1/08 375/341 |
| 2011/0235584 A1* | 9/2011 | Chen | H04L 1/008 370/328 |
| 2012/0002541 A1 | 1/2012 | Lee et al. | |
| 2012/0008590 A1 | 1/2012 | Novak et al. | |
| 2012/0020320 A1 | 1/2012 | Issakov et al. | |
| 2012/0033595 A1* | 2/2012 | Aoyama | H04W 76/048 370/311 |
| 2012/0082044 A1 | 4/2012 | Lysejko | |
| 2012/0122467 A1 | 5/2012 | Auer et al. | |
| 2012/0163208 A1 | 6/2012 | Kamble et al. | |
| 2012/0163319 A1 | 6/2012 | Roessel | |
| 2012/0184316 A1 | 7/2012 | Ode | |
| 2012/0213110 A1 | 8/2012 | Yamaguchi | |
| 2012/0281569 A1 | 11/2012 | Yamamoto et al. | |
| 2013/0064129 A1 | 3/2013 | Koivisto et al. | |
| 2013/0128834 A1 | 5/2013 | Higuchi | |
| 2013/0176952 A1 | 7/2013 | Shin et al. | |
| 2013/0188492 A1 | 7/2013 | Gorgen et al. | |
| 2013/0190027 A1* | 7/2013 | Cao | H04W 52/0206 455/509 |
| 2013/0229972 A1* | 9/2013 | Lee | H04W 72/082 370/312 |
| 2013/0242771 A1* | 9/2013 | Ohta | H04B 7/15585 370/252 |
| 2013/0242823 A1* | 9/2013 | Lin | H04W 99/00 370/280 |
| 2013/0272251 A1 | 10/2013 | Schmidt et al. | |
| 2014/0098663 A1 | 4/2014 | Vos et al. | |
| 2014/0098781 A1 | 4/2014 | Vos et al. | |
| 2014/0153516 A1* | 6/2014 | Young | H04W 48/12 370/329 |
| 2014/0198726 A1* | 7/2014 | Xu | H04W 24/02 370/328 |
| 2014/0307697 A1* | 10/2014 | Beale | H04L 5/0044 370/329 |
| 2014/0369223 A1* | 12/2014 | Takeda | H04J 11/0093 370/252 |
| 2015/0117352 A1 | 4/2015 | Nammi | |
| 2015/0195094 A1* | 7/2015 | Yu | H04W 4/005 370/312 |
| 2015/0222407 A1 | 8/2015 | Nammi et al. | |

FOREIGN PATENT DOCUMENTS

| | | |
|---|---|---|
| CN | 101517929 A | 8/2009 |
| CN | 101567714 A | 10/2009 |
| CN | 101785220 A | 7/2010 |
| CN | 102047732 A | 5/2011 |
| EP | 2259452 A1 | 12/2010 |
| EP | 2485552 A1 | 8/2012 |
| EP | 2904864 A1 | 8/2015 |
| EP | 2995116 A1 | 3/2016 |
| WO | WO-03058907 A1 | 7/2003 |
| WO | WO-2011100479 A1 | 8/2011 |
| WO | WO-2013027522 A1 | 2/2013 |
| WO | 2014/053067 | 4/2014 |
| WO | WO-2014/055878 | 4/2014 |

OTHER PUBLICATIONS

"3rd Generation Partnership Project; Technical Specification Group Radio Access Network; Study on provision of low-cost MTC UEs based on LTE; (Release 11) 3GPP TR 36.888," 3rd Generation Partnership Project, www.3gpp.org; 43 pages.

3GPP TS 36.211 "Evolved Universal Terrestrial Radio Access (E-UTRA); Physical channels and modulation" Release 11; 108 pages.

3GPP TS 36.306 "Technical Specification; 3rd Generation Partnership Project; Technical Specification Group Radio Access Network; Evolved Universal Terrestrial Radio Access (E-UTRA); User Equipment (UE) radio access capabilities," Release 11, V11.3.0, Apr. 2013; 29 pages.

3GPP TS 36.331, Version 11.3.0, "3rd Generation Partnership Project; Technical Specification Group Radio Access Network; Evolved Universal Terrestrial Radio Access (E-UTRA); Radio Resource Control (RTC); Protocol specification (Release 11)," 348 pages. Apr. 2013.

Beale, M., "Future challenges in efficiently supporting M2M in the LTE standards," 2012 IEEE Wireless Communications and Networking Conference Workshop, Apr. 2012.

LTE in Wireless: All about SIB's in LTE, accessed May 1, 2015 from http://lteinwireless.blogspot.ca/2011/06/all-about-sibs-in-lte.html; 6 pages.

International Search Report and Written Opinion of International Application No. PCT/CA2013/050750; dated Dec. 5, 2013; 8 pages.

International Search Report and Written Opinion of International Application No. PCT/CA2013/050752; dated Dec. 27, 2013; 7 pages.

International Search Report and Written Opinion of International Application No. PCT/CA2014/050397; dated Jul. 16, 2014; 9 pages.

LTE TDD Technology Overview by Maria Djanatliev http://www.slideshare.net/GoingLTE/lte-tdd-technology-overview; 13 pages.

Non-Final Office Action for U.S. Appl. No. 14/046,265, dated Jun. 18, 2015; 23 pages.

Hung H. Myung, "Technical Overview of 3GPP LTE", May 18, 2008, Indian Institute of Technology, https://www.iith.ac.in/~tbr/teaching/docs/LTE-Tutorial.pdf ; 53 pages.

IPWireless Inc.: "Backwards compatible support for reduced bandwidth LTE UEs", 3GPP Draft; R1-120799, 3rd Generation Partnership Project (3GPP), Mobile Competence Centre; 650, Route Des Lucioles; F-06921 Sophia-Antipolis Cedex; France, vol. RAN

(56) References Cited

OTHER PUBLICATIONS

WG1, No. Dresden, Germany; 20120206-20120210, Jan. 31, 2012 (Jan. 31, 2012), XP050563142, [retrieved on Jan. 31, 2012] *Sections I-VIII*.
Sierra Wireless: PUSCH coverage improvement through limiting the number of sub-carriers per resource block. 3GPP Draft: R1-125083 PUSCH Coverage Improvement Through Limiting The Number of Subcarriers Per Resource Clock_Clean, 3rd Generation Partnership Project (3GPP), Mobile Competence Centre; 650, Route D, col. RAN WG1, No. New Orleans, USA; 2121112-20121116 Nov. 3, 2012 (Nov. 3, 2012), XP050662950, Retrieved from the Internet: URL: http://www.3gpp.org/ftp/tsg_ran/WG1_RL1/TSGR1_71/Docs/ [retrieved on Nov. 3, 2012] *the whole document*.
Sierra Wireless: "Text proposal for MTC coverage improvement through limiting the number of sub-carriers per resource block", 3GPP Draft; R1-130064 TP_Limiting_Number_Of_Subcarriers_Clean, 3rd Generation Partnership Project (3GPP), Mobile Competence Centre; 650, Route Des Lucioles; F-06921 Sophia-Antipolis Cedex; France, vol. RAN WG1, No. Malta; 2130128-20130201 Jan. 19, 2013 (Jan. 19, 2013), XP050663512, Retrieved from the Internet: URL: http://www.3gpp.org/ftp/tsg_ran/WG1_RL1/TSGR1_72/Docs/ [retrieved on Jan. 19, 2013] *the whole document*.
Extended European Search Report issued by the European Patent Office for European Patent Application No. 13843386.7, dated Apr. 11, 2016, 7 pages.
Extended European Search Report issued by European Patent Office for European Patent Application No. 13843701.7, dated Apr. 1, 2016, 9 pages.
Office Action issued for U.S. Appl. No. 14/046,265, dated Dec. 3, 2015. 26 pages.
Office Action issued for U.S. Appl. No. 14/046,475, dated Jul. 2, 2015. 18 pages.
Office Action issued for U.S. Appl. No. 14/046,475, dated Apr. 22, 2016. 26 pages.
Corresponding U.S. Appl. No. 15/171,550; 28 pages.
Extended European Search Report for European Application No. 14794497.9; dated Nov. 18, 2016; 13 pages.
Huawei et al: "Coverage enhancement for physical channels and signals for low-cost MTC", 3GPP Draft, R1-130017, (Jan. 2013).
Samsung: "(E)PDCCH coverage enhancements for low-cost MTC UEs", 3GPP Draft, R1-131017, (Apr. 2013).
Huawei et al: "Coverage analysis on (E) PDCCH and PUCCH for low-cost MTC UEs", 3GPP Draft, R1-130889, (Apr. 2013).
Sierra Wireless: "Restrictive Scheduling for SIBs for MTC coverage improvement" 3GPP Draft, R1-131867, (May 2013).
ZTE: "SIB Coverage improvement" 3GPP Draft, R1-135358, (Nov. 2013).
Office Action in U.S. Appl. No. 14/046,475; dated Jan. 3, 2017; 24 pages.
Office Action for U.S. Appl. No. 14/046,475; dated Jul. 28, 2017; 26 pages.
Office Action in Chinese Patent Application No. 201380063461.7: dated Feb. 26, 2018; 9 pages.
Office Action in U.S. Appl. No. 15/171,550; dated Jan. 26, 2018; 21 pages.
Office Action in U.S. Appl. No. 14/046,475; dated Mar. 30, 2018; 19 pages.
Examination Report of European Patent Application No. 14794497.9; dated Mar. 15, 2018; 6 pages.

* cited by examiner

METHOD AND APPARATUS FOR COMMUNICATION OF SYSTEM INFORMATION IN A WIRELESS SYSTEM

CROSS-REFERENCE TO RELATED APPLICATIONS

This application claims the benefit and priority of U.S. Provisional Application 61/821,954, filed May 10, 2013. The foregoing application is incorporated by reference herein in its entirety.

FIELD OF THE TECHNOLOGY

The present technology pertains in general to wireless communications and in particular to communication of certain broadcast system information, such as system information blocks, in accordance with wireless standards such as LTE.

BACKGROUND

Wireless communication systems such as LTE systems exhibit limited coverage, particularly for terminals exposed to marginal radio conditions or on the edge of a coverage area. It is often desired to improve coverage, and typical approaches to coverage improvement include increasing data repetition, decreasing the coding rate, or the like. Currently, there is a focus on providing coverage improvement for machine-to-machine wireless devices, which may have significantly different operating requirements than user devices. For example, machine-to-machine devices such as wireless monitors or meters may only transmit relatively small amounts of data, possibly infrequently, and possibly with high tolerance to latency, system acquisition times, or the like.

The Physical Downlink Shared Channel (PDSCH) used in LTE systems is one communication channel which may benefit from coverage improvement efforts. In particular, system information broadcast via System Information Blocks (SIBs) on this channel may benefit from such efforts. However, it is difficult to improve coverage for this channel in a way that would not require significant changes to the LTE standard, and hence would not raise backward compatibility issues.

Therefore there is a need for a method and apparatus for achieving coverage improvement in shared channels such as the PDSCH that is not subject to one or more limitations in the prior art.

This background information is provided for the purpose of making known information believed by the applicant to be of possible relevance to the present technology. No admission is necessarily intended, nor should be construed, that any of the preceding information constitutes prior art against the present technology.

SUMMARY OF THE TECHNOLOGY

An object of the present technology is to provide a method and apparatus for communicating system information, such as System Information Blocks, in a wireless communication system such as LTE. In accordance with an aspect of the present technology, there is provided a method for communicating system information from a base station to a terminal in a wireless network, the base station configured to broadcast the system information in accordance with a predetermined standard, the standard defining a range of allowable values for at least one characteristic of the broadcast, said at least one characteristic of the broadcast selected from said range of allowable values, the method comprising: providing a restricted range of values for the at least one characteristic as a strict subset of the range of allowable values; repeatedly broadcasting the system information, wherein, for each repetition of the broadcast, the at least one characteristic is selected from the restricted range of values; providing an indication of the restricted range of values to the terminal; using said indication at the terminal to facilitate reception of a plurality of the repetitions of the broadcast; and combining the plurality of the repetitions at the terminal to facilitate recovery of the system information therefrom.

In accordance with another aspect of the present technology, there is provided a method for communicating a System Information Block (SIB) from an eNB to a terminal in an LTE wireless network, the eNB configured to repeatedly broadcast the SIB, each broadcast having at least one characteristic which is configured in accordance with a range of allowable values defined by the LTE standard, the method comprising: providing a restricted range of values for the at least one characteristic as a strict subset of the range of allowable values; for each broadcast of the SIB, selecting the at least one characteristic of said broadcast from the restricted range of values; providing an indication of the restricted range of values to the terminal; using said indication at the terminal to facilitate reception of a plurality of the repetitions of the broadcast SIB; and combining the plurality of the repetitions at the terminal to facilitate recovery of the SIB therefrom.

In accordance with another aspect of the present technology, there is provided a base station for communicating system information to a terminal in a wireless network, the base station configured to broadcast the system information in accordance with a predetermined standard, the standard defining a range of allowable values for at least one characteristic of the broadcast, said at least one characteristic of the broadcast selected from said range of allowable values, the base station comprising: a system information broadcast restriction module configured to provide a restricted range of values for the at least one characteristic as a strict subset of the range of allowable values; and a system information broadcast module configured to repeatedly broadcast the system information, wherein, for each repetition of the broadcast, the at least one characteristic is selected from the restricted range of values, wherein an indication of the restricted range of values is provided to the terminal, the terminal configured to use said indication to facilitate reception of a plurality of the repetitions of the broadcast, the terminal further configured to combine the plurality of the repetitions to facilitate recovery of the system information therefrom.

In accordance with an aspect of the present technology, there is provided a wireless terminal for receiving system information from a base station in a wireless network, the base station configured to broadcast the system information in accordance with a predetermined standard, the standard defining a range of allowable values for at least one characteristic of the broadcast, said at least one characteristic of the broadcast selected from said range of allowable values, the wireless terminal comprising: a reception module configured to receive a plurality of repetitions of the broadcast system information; and a recovery module configured to combine the received plurality of the repetitions to facilitate recovery of the system information therefrom; wherein the base station is configured to provide a restricted range of values for the at least one characteristic as a strict subset of the range of allowable values; and repeatedly broadcast the system information, wherein, for each repetition of the broadcast, the at least one characteristic is selected from the restricted range of values, and wherein the reception module is configured to use a provided indication of the restricted range of values to facilitate reception of the plurality of the repetitions of the broadcast.

In accordance with an aspect of the present technology, there is provided a wireless communication system comprising a base station and a terminal, the system configured in part for wirelessly communicating system information from the base station to the terminal, the base station configured to broadcast the system information in accordance with a predetermined standard, the standard defining a range of allowable values for at least one characteristic of the broadcast, said at least one characteristic of the broadcast selected from said range of allowable values, the system comprising: a system information broadcast restriction module of the base station, configured to provide a restricted range of values for the at least one characteristic as a strict subset of the range of allowable values; a system information broadcast module of the base station, configured to repeatedly broadcast the system information, wherein, for each repetition of the broadcast, the at least one characteristic is selected from the restricted range of values; a reception module of the terminal, configured to use a provided indication of the restricted range of values to facilitate reception of a plurality of the repetitions of the broadcast; and a recovery module of the terminal, configured to combine the received plurality of the repetitions to facilitate recovery of the system information therefrom.

In accordance with another aspect of the present technology, there is provided a computer program product comprising a computer readable medium storing computer executable statements and instructions thereon that, when executed by a computer, perform operations for implementing one or more methods or portions thereof, as described herein.

BRIEF DESCRIPTION OF THE FIGURES

These and other features of the technology will become more apparent in the following detailed description in which reference is made to the appended drawings.

DETAILED DESCRIPTION OF THE TECHNOLOGY

Definitions

Figure 1:
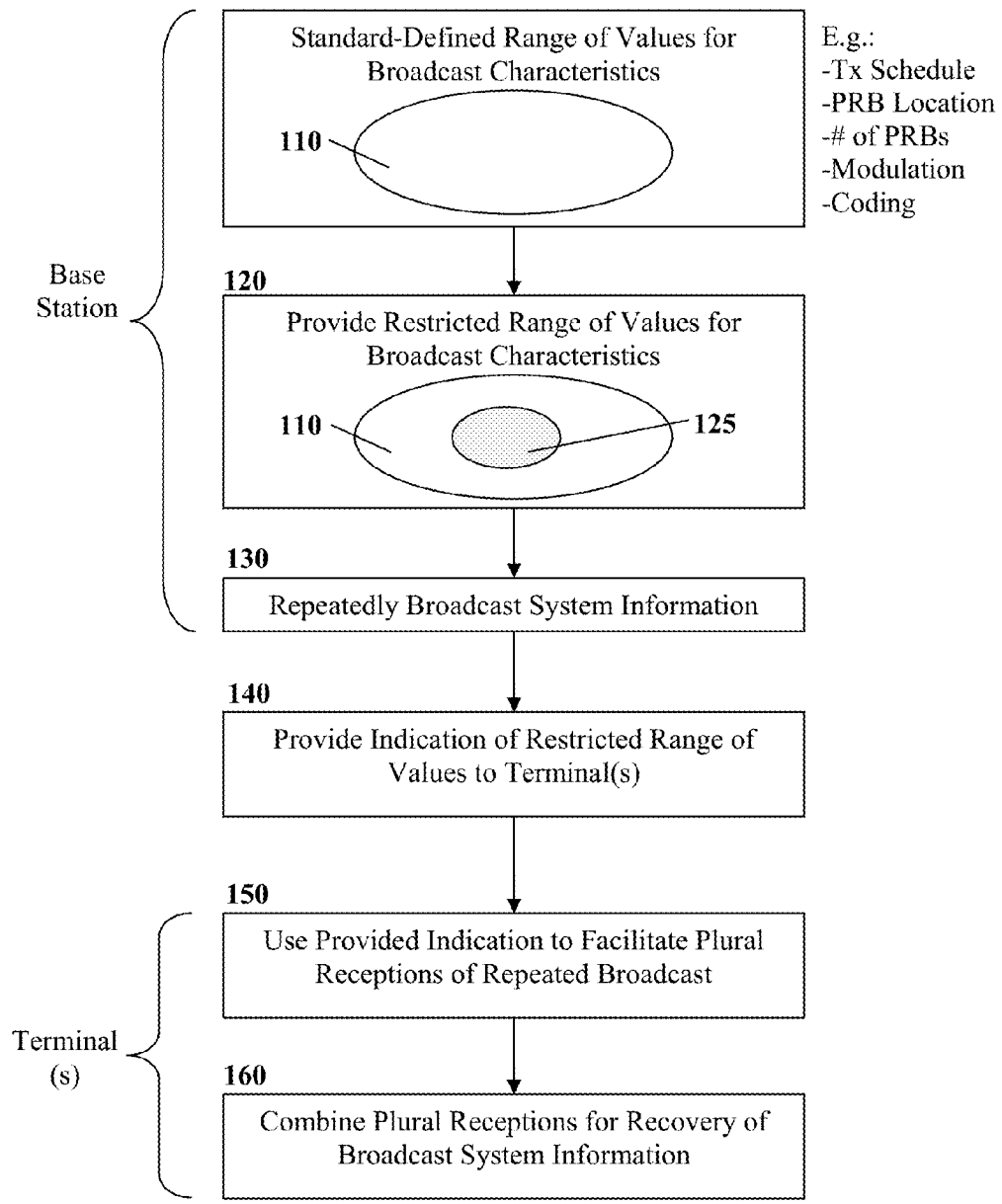
FIG. 1 illustrates a method provided in accordance with embodiments of the present technology.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this technology belongs.

Various technical terms specified herein may be understood with reference to standards documents pertaining to the Long Term Evolution (LTE) wireless communication, or similar wireless communication standards such as UMTS. While these terms should be read in a manner that is consistent with at least the LTE standard, it is understood that the technology as described herein may be adapted for use with certain other existing or future wireless communication standards or protocols.

Aspects of the present technology provide for increased signal coverage or increased signal gain or both with respect to wireless broadcasts of certain system information from a base station to terminal devices, for example in a wireless communication system utilizing a protocol such as LTE. The information may include system information blocks (SIBs) transmitted via the LTE physical downlink shared channel (PDSCH). The information is repeated, for example periodically or quasi-periodically, thereby generating plural copies of the information. The terminal devices, commonly referred to as user equipment (UE) but including machine-to-machine and other types of devices, are configured to receive and combine plural copies of the information and to decode the combination of the plural copies in order to increase decoding capability. For example, by combining plural copies of the same information, the signal-to-noise ratio of the combination can be deemed to be increased relative to the signal-to-noise ratio of a single copy of the information. In short, the terminal devices are configured to accumulate the radio energy corresponding to the broadcast information over time, by receiving, storing and combining plural repetitions of the relevant broadcast radio energy. Each transmitted copy of the information corresponds to adding extra energy to the transmission, for example corresponding to an increase in the ratio of energy per bit to noise power spectral density. The combining may correspond to maximum-ratio combining or another type of combining, for example.

In order to achieve the above, the wireless terminals are configured to at least partially know a priori, or otherwise predict, the timing, radio frequency, and other relevant information pertaining to the base station broadcasts. In various embodiments, in order to facilitate predictability, the information, for example including SIBs, is broadcast over the air in accordance with a known or predicable schedule, both in terms of time and radio frequency, in accordance with other known or predictable characteristics, such as modulation and coding schemes, number of resource blocks, used, or the like, or in accordance with a combination of the above.

Thus, for example, in addition to using known or predictable system frames and/or sub-frames or windows of sub-frames for broadcasting SIBs, as may be done presently, the present technology provides other broadcast aspects known or more predictable, such as the number of resource blocks used to broadcast a given SIB, the particular resource blocks used, the modulation scheme used, the coding rate, or the like, or a combination thereof.

In various embodiments, in order for the accumulation of radio energy to adequately reflect the broadcast information, the various copies of the broadcast information should have similar or possibly identical information content (although possibly coded differently in different redundancy versions). In current implementations of LTE, it is observed that SIBs typically satisfy this criterion, since at least some SIB content changes infrequently. In particular, SIB1 and SIB2 typically have infrequently changing content. Therefore, embodiments of the present technology apply the above-identified repetition technique for communication of SIB information. In various embodiments, the predictability of broadcast SIB information is enhanced by causing the base station to broadcast SIBs in a more predictable manner than is typical in the prior art. However, such adjustments may be made within the parameters of the communication standard being implemented (for example LTE). Therefore, the affected base stations will still be capable of communicating with legacy terminals.

In some embodiments, consecutively transmitted copies of the information are substantially identical to each other, or nearly identical except for a portion of the information content which potentially changes over time in a predictable or unpredictable manner. This approach facilitates a form of repetition channel coding. In other embodiments, consecutively transmitted copies of the information are encoded differently, thereby facilitating a different form of error detecting and/or error correcting coding scheme. Various such channel coding schemes would be readily understood by a worker skilled in the art.

In some embodiments, when plural transmitted copies of the information include different information but those differences are predictable, channel coding can be achieved for the different information by factoring in the known manner in which the information differs between copies. For example, suppose an information field is known to change by a given increment value q between transmitted copies, and K copies of that field are observed, each corresponding to one of a plurality of transmitted copies of the information and each observation yielding value $O(k)$ for $k=1$ to K. Then the noise for observation $O(1)$ can be reduced by taking $O(1)$ equal to the average of $P(k)$ over $k=1$ to K, where $P(k)$ is a compensated observation $P(k)=O(k)-(k-1)q$.

Aspects of the present technology accordingly provide for wirelessly communicating broadcast system information in accordance with a given wireless communication standard. For example, broadcast may be over the LTE physical downlink shared channel (PDSCH) and may comprise system information blocks such as one or more of SIB1, SIB2, SIB3, SIB4, SIB5, SIB6, SIB7, SIB8, SIB9, SIB10, SIB11, SIB12, SIB13, SIB14, SIB15 and SIB16. In some embodiments, only deemed essential SIBs, such as SIB1 to SIB4, are transmitted in the manner described herein. The given wireless communication standard is such that the base station has at least some autonomy to schedule broadcasts of the system information, within at least some predetermined parameters. That is, all of the broadcast parameters for a particular SIB may not be known a priori. Aspects of the present technology may therefore comprise restricting the autonomy of the base station so that the parameters fall within a tighter range than is allowed by the standard. This enhances predictability by restricting SIB scheduling flexibility. In some embodiments the schedule is specified such that it is substantially deterministic and therefore may be easily predicted by the wireless terminals. This may require scheduling other transmission activity of the base station around the defined schedule for broadcasting the system information. For example, due to the additional scheduling restrictions, the base station may occasionally be required to postpone a UE's downlink grant message due to conflicts with the fixed schedule for SIB transmission. This may increase system latency somewhat, however overhead and spectral efficiency are not expected to be affected to a considerable degree. It is noted that SIB1 is already transmitted according to a fixed time schedule, so impacts from SIB1 are further limited. Alternatively, in some embodiments, the resources scheduled for use in a SIB transmission may be occasionally reallocated, the result being that the accumulated SIB energy at the terminal will be corrupted by some amount of noise. However, provided that such reallocations occur only rarely, and that the terminal also acquires a sufficient number of uncorrupted copies of the repeated SIB, this amount of noise may be tolerable.

Embodiments of the present technology may facilitate providing improved coverage for decoding SIBs with limited degradation of spectral efficiency. For example, the SIB transmission frequency may remain as currently defined for LTE systems. Although accumulating an adequate number of copies of a SIB at the terminal may take up to several seconds, such latency is deemed to be tolerable for at least machine-to-machine type devices. Other devices may still use legacy methods of acquiring SIB information. In fact, a single device may switch between methods of acquiring SIB information.

In some embodiments, a terminal may be configured to attempt to decode the SIB after each transmitted copy of the SIB is received and accumulated/combined with previously received copies. If the CRC check for the decoding operation passes then the SIB is deemed to be successfully decoded. Otherwise the terminal is configured to receive and combine at least one more copy of the SIB and then attempt to decode the SIB again. If the decoding operation succeeds on the first copy of the SIB, then no combining operations are actually required. It is noted that the time to decode is dependent on the coverage required. For example, for SIB1, the time to decode may range from 1 SIB1 (20 ms) in good coverage to 100 SIB1 (2 seconds) in poor coverage. For example, the combining of a plurality of repetitions of the SIB can improve recovery of the system information in the presence of noise.

With reference to FIG. 1, an aspect of the present technology accordingly provides a method for communicating system information from a base station to a terminal in a wireless network. The base station is generally configured to broadcast the system information in accordance with a predetermined standard, the standard defining a range 110 of allowable values for at least one characteristic of the broadcast. The range may be continuous or non-continuous, i.e. there may or may not be gaps in the range. The standard may be a version of the LTE standard, and the system information may correspond to System Information Blocks (SIBs) of one or more types, for example transmitted over the PDSCH and (currently) scheduled via the PDCCH. Under the existing standard, the at least one characteristic of the broadcast is selected by the base station from the range of allowable values. Characteristics of the broadcast may include details of the transmission schedule, including timing and physical resource block (PRB) locations within the band, details of the coding rate, modulation and coding scheme used, details of the number of physical resource blocks used in the broadcast, and the like.

The above-mentioned method comprises providing 120 a restricted range 125 of values for the at least one characteristic of the broadcast. The restricted range 125 of values is a strict subset of the range 110 of allowable values defined by the standard, and may potentially include a single data point or a range of data points. Each such data point may have the same dimensionality as the range of values. For example, if there are N different characteristics of the broadcast which are being restricted, then the data point may be a point in N dimensional "value space." Thus, for example, the restricted range of values may have the effect that, of all the options relating to scheduling, modulation, coding, number and location of physical resource blocks, and the like, which the standard defines as being selectable at the discretion of the base station for broadcasting the system information, only one or a limited number of these options are made available for actual use. The restricted range of values is not necessarily contiguous. In some embodiments, the restricted range of values may include plural potential values for some dimensions and only a single specified value for other dimensions, where dimensions correspond to options such as relating to scheduling, modulation, coding, number and location of physical resource blocks, or the like.

The above-mentioned method further comprises repeatedly broadcasting 130 the system information. In particular, for each repetition of the broadcast of system information, for example for each SIB broadcast, the at least one characteristic of the broadcast is selected from the restricted range of values, as described above. The method further comprises providing 140 an indication of the restricted range 125 of values to the terminal. The indication may be provided a priori for example through pre-configuration of the terminal at the time of programming or provisioning, or at a later time. The indication may be provided a priori through standardization, that is by configuring the terminals according to a given standard which mandates certain operation of the terminals in accordance with the restricted range of values, thereby causing the terminals to implicitly operate in accordance with the restricted range of values. The indication may be provided or updated via over the air wireless update messages. In various embodiments, SIB1 contains an indication relating to the restricted range for at least SIB2. Further, in various embodiments, SIB2 contains an indication relating to the restricted range for some or all higher-numbered SIBs.

The method further comprises using 150 the provided indication at the terminal to facilitate reception of a plurality of the repetitions of the repeated broadcast. For example, the terminal, expecting that the various characteristics of the broadcast will fall within a known restricted range of values (which is possibly a single data point), can simplify reception of the broadcast. Reception may be simplified, for example, in that the terminal knows which resource blocks to monitor at which times, and how to decode the information carried by those resource blocks, possibly without also having to monitor for and receive scheduling information regarding the system information broadcast.

In various LTE embodiments, for example, since the terminal now possesses or is capable of predicting all the information that would normally be provided in the DCI message, the terminal may no longer need to decode the PDCCH for DCI messages corresponding to SIB broadcasts, (wherein all SIB broadcasts are scheduled on the PDCCH in LTE) when using the present technology. Since the terminal may be in low coverage, problems with decoding the PDCCH in marginal signal conditions may thus be avoided. In the case that the restricted range of values comprises a limited plurality of data points, the terminal may perform blind decoding on some or all of the options presented by the data points. As is also noted elsewhere herein, some SIB broadcasts may correspondingly omit the PDCCH portion.

The method further comprises combining 160 the plurality of the repetitions at the terminal to facilitate recovery of the system information therefrom. This may comprise coherent combining of the broadcasts, for example similar to the coherent combining which occurs for primary synchronization signals and secondary synchronization signals in LTE for decoding. Combining may comprise maximum ratio combining or other combining, for example. Insofar as the plurality of broadcast repetitions are identical, combining may be used to increase the signal-to-noise ratio of the message conveyed by the repeated broadcast. By scheduling system information transmissions to occur with known parameters, such as timings, frequencies, resource block numbers and locations, modulation and coding parameters, and the like, coherent combining of system information by terminals is facilitated.

Figure 4:
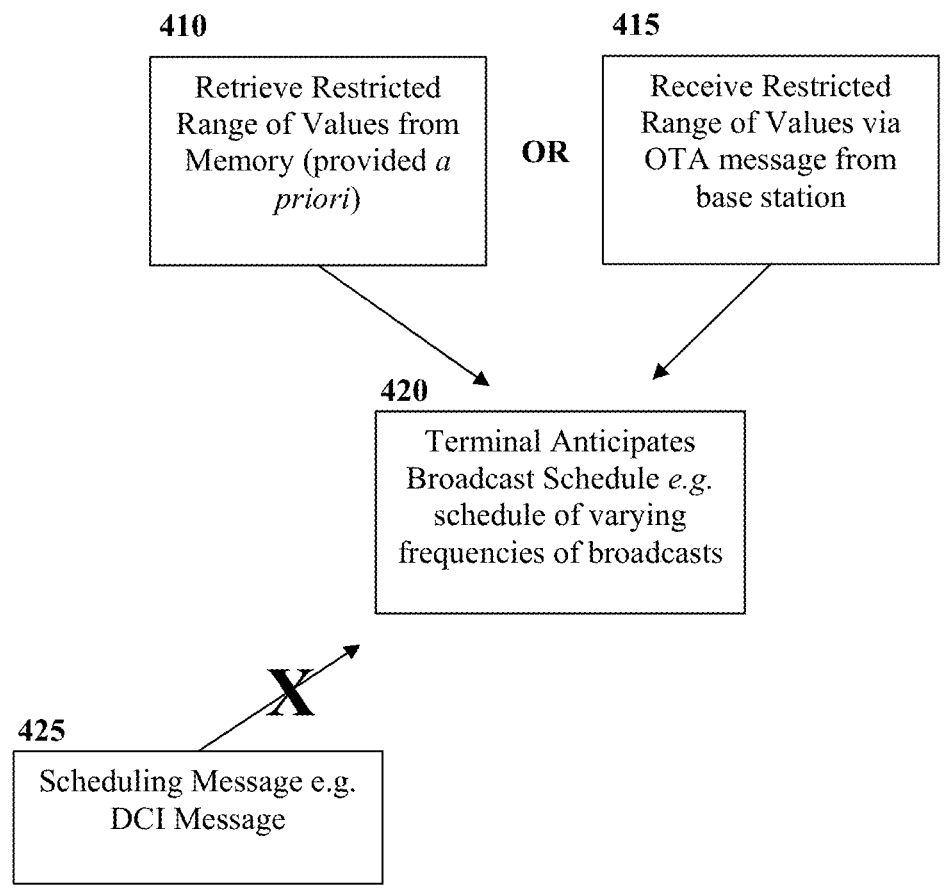
FIG. 4 illustrates operations by a terminal for anticipating broadcasts without regard to scheduling messages, in accordance with embodiments of the present technology.

FIG. 4 illustrates operations by a terminal for anticipating 420 broadcasts without regard to scheduling messages, in accordance with embodiments of the present technology. Thus, the terminal may not require reception of scheduling messages 425, such as DCI messages. The anticipation may be based on a restricted range of values of broadcast parameters retrieved from memory 410 or a restricted range of values of broadcast parameters received over the air 415 (OTA) from a base station.

In various embodiments, the method as described herein is implemented by a computer, or by a collection of computers. Each computer generally comprises a microprocessor operatively coupled to memory, wherein the microprocessor executes stored instructions to manipulate data in accordance with the method. In some embodiments, the computer may correspond to the components of a wireless terminal, such as a UE or machine-to-machine terminal. In some embodiments, the computer may correspond to the components of a base station, for example an eNB, or a computer part thereof. The structure and operation of such computing devices is generally known in the art.

Figure 2:
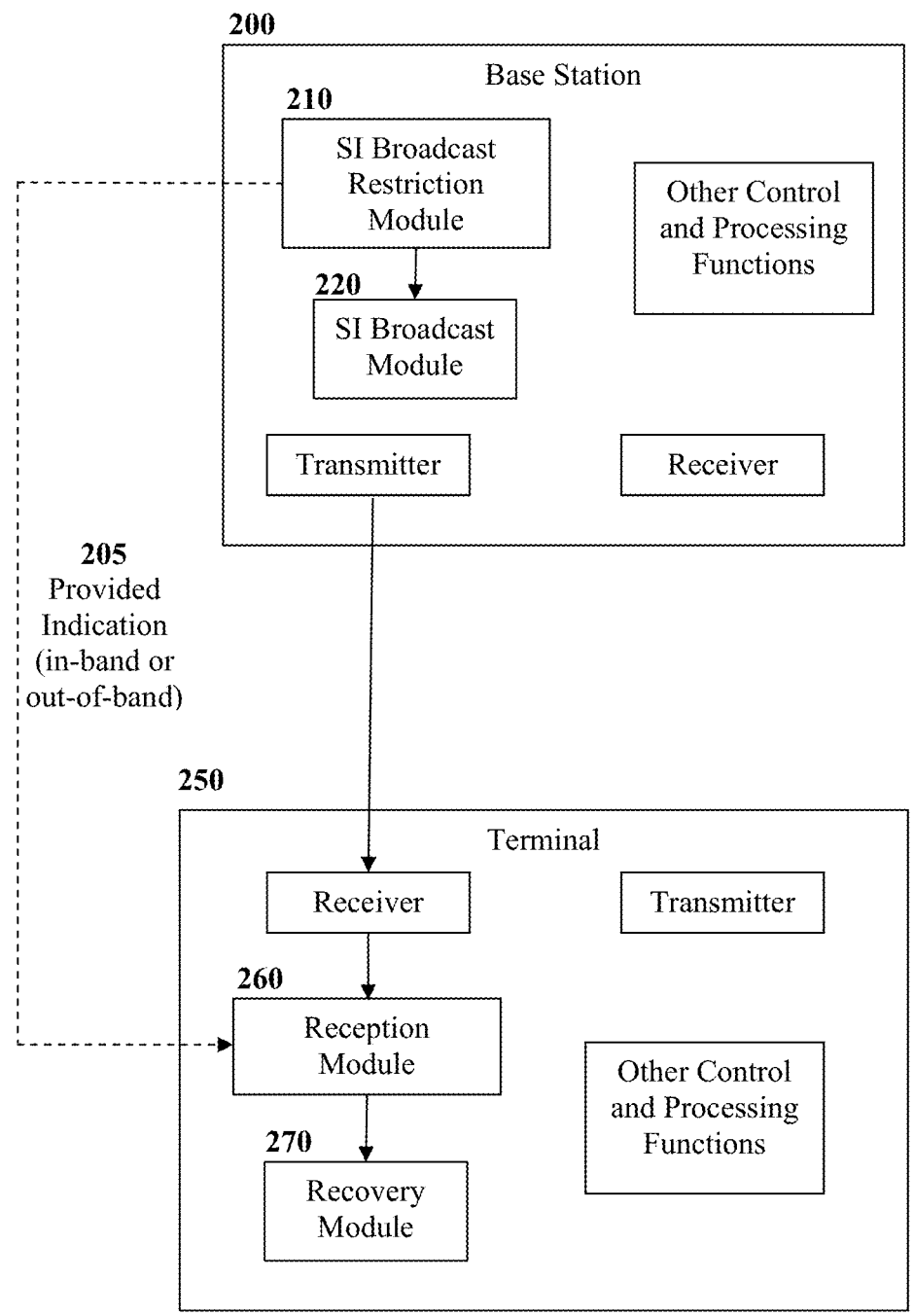
FIG. 2 illustrates a system provided in accordance with embodiments of the present technology.

With reference to FIG. 2, another aspect of the present technology provides a wireless communication system comprising a base station 200 and a wireless terminal 250. Although only a single wireless terminal 250 is shown, typically the system will comprise a plurality of such wireless terminals associated with each base station. The system is configured in part for wirelessly communicating system information, such as SIBs, from the base station to the terminal. The base station is configured in particular to broadcast the system information in accordance with a predetermined standard, such as LTE. More generally the standard defines a range of allowable values for at least one characteristic of the broadcast, said at least one characteristic of the broadcast selected from said range of allowable values.

The above-mentioned wireless communication system comprises a base station having a system information broadcast restriction module 210 and a system information broadcast module 220. The base station otherwise includes the necessary components of a standard base station, such as an eNB in LTE. The system information broadcast restriction module is configured to provide a restricted range of values for the at least one characteristic as a strict subset of the range of allowable values. The system information broadcast module is configured to repeatedly broadcast the system information, such that, for each repetition of the broadcast, the at least one characteristic is selected from the restricted range of values.

The wireless terminal of the above-mentioned system comprises a reception module 260 and a system information recovery module 270. The wireless terminal otherwise includes the necessary components of a standard wireless terminal, such as a mobile or non-mobile UE or machine-to-machine terminal of an LTE network. The reception module 260 is configured to use a provided indication 205 of the restricted range of values to facilitate reception of a plurality of the repetitions of the broadcast. The recovery module 270 is configured to combine the received plurality of the repetitions to facilitate recovery of the system information therefrom. The reception module 260 and/or the recovery module 270 may be configured to participate in blind decoding of the received data when required.

Another aspect of the present technology provides a base station of the above-described system. Yet another aspect of the present technology provides a wireless terminal of the above-described system.

System Information Blocks

In current LTE systems, System Information Blocks (SIBs) are transmitted via the Broadcast Control Channel (BCCH), Downlink Shared Channel (DL-SCH), and Physical Downlink Shared Channel (PDSCH). SIBs are scheduled using the Physical Downlink Control Channel (PDCCH), as is typical for PDSCH traffic, using a Downlink Control Information (DCI) message broadcast by the base station over the PDCCH.

Typically, a wireless terminal (User Equipment or UE) requires knowledge of at least SIB1 and SIB2 in order to access a corresponding base station (eNB). Once a wireless terminal has acquired all of the SIBs, it may no longer need to wake up to receive them, but may instead wake up to make a determination of whether a change in one or more of the SIBs is indicated to have occurred.

Transmission of SIB1 is time-domain scheduled somewhat differently from the other SIBs. SIB1 is transmitted according to a fixed schedule with a periodicity of 80 ms, with repetitions made within the 80 ms. In particular, the first transmission of SIB1 is transmitted in subframe number 5 of radio frames for which the System Frame Number (SFN) mod 8=0, and repetitions (different redundancy versions of SIB1) are transmitted in subframe number 5 of all other radio frames for which SFN mod 2=0. System Information (SI) windowing is not used for SIB1. SIB1 may still be scheduled anywhere within the UE's common PDCCH search space.

Currently, when Downlink Control Information (DCI) message format 1A or format 1C is in use, the modulation scheme is fixed as Quadrature Phase Shift Keying (QPSK). The coding is dynamic depending on the amount of information sent in SIB1, via the Transport Block Size Index ($I_{TBS}$).

Transmission of other SIBs, e.g. SIB2 to SIB16, is scheduled dynamically and flexibly in time. Scheduling particulars are communicated via the information elements si-Periodicity and si-WindowLength, which are conveyed via SIB1.

The scheduling information list conveyed via SIB1 informs the UE regarding the presence of one or more SIB types, and may include at least the si-Periodicity and si-WindowLength parameters for one or more higher-level SIBs. Si-Periodicity is indicative of the periodicity of repeated broadcasts of a designated SIB, in terms of radio frames. Si-WindowLength is indicative of a range of subframes in which SIBs may be broadcast. The parameter SIB-MappingInfo conveys the type of SIBs mapped.

As mentioned above, SIBs are scheduled by the PDCCH. In the common search space, UEs will typically search for Formats 1A and 1C, and may additionally search for other formats such as Formats 3 or 3A (which have the same size as Formats 0 and 1A but have their Cyclic Redundancy Check (CRC) scrambled by a common identity rather than a UE-specific identity).

DCI Format 1C is typically used for compact transmission of PDSCH assignments.

LTE includes four PDCCH formats, numbered 0, 1, 2 and 3 and having 1, 2, 4, and 8 Control Channel Elements (CCEs) respectively. For PDCCH format 2, there may be four candidates in the common search space, while for PDCCH format 3, there are only two candidates in the common search space. PDCCH formats 2 and 3 are typically used to provide good coverage.

As will be readily understood, while the LTE Master Information Block generally contains the most important parameters, the various SIBs contain other parameters. SIB1 includes cell access related parameters and scheduling parameters. SIB2 includes common and shared channel configuration information. SIB3 includes parameters required for intra-frequency cell reselection. SIB4 includes information on intra-frequency neighbouring cells. SIB5 includes information on inter-frequency neighbouring cells. SIB6 includes information for reselection to UMTS (UTRAN) cells if no suitable LTE cell is available. SIB7 includes information for reselection to GSM (GERAN) cells if no suitable LTE or UMTS cell is available. SIB8 includes information for reselection to CDMA2000 systems. SIB9 includes the home eNB name for future femtocell applications. SIB10 and SIB11 include Earthquake and Tsunami Warning System information. SIB12 includes commercial mobile alerting system information.

For SIB1, the amount of data within the SIB is flexible, so the coding ($I_{TBS}$) and number of resource blocks used is variable. This information is typically indicated in the DCI message on the PDCCH which is related to scheduling of SIB1.

More details regarding SIBs can be found in the 3GPP specifications, for example in 3GPP TS 36.331, Version 11.3.0, "3rd Generation Partnership Project; Technical Specification Group Radio Access Network; Evolved Universal Terrestrial Radio Access (E-UTRA); Radio Resource Control (RRC); Protocol specification (Release 11)," March, 2013, Chapter 6.3, hereinafter referred to as TS 36.331.

Restricted Transmission of SIBs

Embodiments of the present technology comprise restricted transmission of at least some SIBs, as transmitted by the base station via a shared channel such as the PDSCH. Restricted transmission may comprise restricted scheduling of the transmission, restricted configuration of the SIBs and transmission parameters for the SIBs, or a combination thereof. It is noted that this SIB1 is already transmitted in known system frames (provided that the System Frame Number (SFN) is known), and at known sub-frame number 5. Furthermore, SIB1 may convey certain other scheduling information relating to other SIBs as discussed above, for example through the Scheduling Information List parameter. Restricted scheduling may therefore comprise imposing further restrictions on transmission scheduling for the SIBs.

In particular, restricted transmission may comprise scheduling and configuring transmission of the SIBs so that one or more of the following characteristics are known or predictable to the terminals: Transmission times; Particular resource blocks used (location in time and frequency within a predetermined band) for the transmission; Particular modulation scheme used for the transmission; Particular coding rate; Particular transport block size corresponding to $I_{TBS}$, for example; and Particular number of resource blocks used for the transmission or the like.

In various embodiments, restricted transmission is applied only to those SIBs which are critical for operation of classes of terminals which are configured to take advantage of the present technology. For example, restricted scheduling may be applied to SIB1 and SIB2. As another example, restricted scheduling may be applied to SIB1, SIB2, SIB3 and SIB4.

It is further noted that, although transmission of SIBs is restricted, the imposed restrictions fall within the range of options specified by the standard. Therefore, restricted transmissions can still be received by legacy terminals, which facilitates backward compatibility of the present technology.

For SIB1, embodiments of the present technology comprise setting the modulation and coding scheme of the SIB PDSCH to a known or predictable selection. For example, modulation may be fixed for all formats to be QPSK. The coding scheme may be set directly or indirectly. For example, when the coding scheme is the function of other factors in the SIB transmission, these other factors may be set or restricted so as to set or restrict the coding scheme in use. Such factors may potentially relate to coverage requirements for legacy UEs and the size (amount of information) in the SIB.

Further for SIB1, embodiments of the present technology comprise providing the SIB PDSCH within the band at a known or predictable location. The location may change in a predictable way, for example as a function of the SFN and radiofrequency bandwidth (RF BW). Changing the location dynamically may facilitate providing frequency diversity.

In some embodiments, for example in relation to LTE, limited availability of PRBs for smaller bandwidth settings (e.g. 1.4 MHz BW channels may only have 6 PRBs), implies that there may be inadequate room for frequency hopping. Therefore, the schedule maybe dependent on the bandwidth, for example as measured in number of resource blocks. This may allow the SIB to move off the center PRBs of the band which may already be used for PSS/SSS and PBCH.

Embodiments of the present technology may comprise selecting a fixed value for $I_{TBS}$ and a fixed number of resource blocks for use by a SIB, for example SIB1. Although the amount of data within SIB1 is flexible within the standard, the amount of data falls within a narrow predefined range, hence restricting this flexibility is expected to have limited impact.

Embodiments of the present technology may alternatively comprise defining a predetermined but limited range for $I_{TBS}$ and the number of resource blocks for use by a SIB. The range may be smaller than that specified by the standard. A UE may then be configured to perform blind decoding using this limited range to limit the blind decoding search. This allows some flexibility while managing computational complexity.

In some embodiments, the current $I_{TBS}$ and the number of resource blocks for use by a SIB such as SIB1 may be indicated in the Master Information Block (MIB), for example using spare bits included in the MIB. A terminal in receipt of the MIB would then be able to predict these configuration parameters for the designated SIB. In some embodiments, SIB1 may be indicative of parameters such as $I_{TBS}$ and $N_{PRB}$ used by SIB2, and SIB2 may be indicative of same or similar parameters related to other higher-numbered SIBs.

In some embodiments, the terminal is configured to accumulate plural copies of the PDCCH DCI message which are transmitted in relation to scheduling of plural copies of the SIB. The plural copies of the PDCCH message may be combined in order to improve the signal-to-noise ratio and decoded. This may require that the plural copies of the DCI message be substantially identical and also in the same known location within the common search space. In LTE, DCI (DL grants) for SIB messages are scheduled within the terminal's common PDCCH search space. Currently the common search space is limited, hence using the same location is considered feasible. In such embodiments, the PDCCH DCI message may be decoded from its plural copies prior to receiving and decoding the related SIB message, which is also decoded from plural copies.

Embodiments of the present technology comprise setting the sub-frame of SIBs other than SIB1 to a known fixed or predictable value. In some embodiments, this may be done by setting the Si-Windowlength parameter to one. The existing method for determining which sub-frame the Si window starts on can be used, so that each type of SIB starts in a different subframe. In some embodiments, since the Si-Windowlength parameter applies to all SIBs, this approach places scheduling constraints even on the non-essential SIBs which are not necessarily intended to be restricted.

In some embodiments, the standard may be adjusted so that essential SIBs are assigned a Si Window length of one, while other non-essential SIBs have a Si Window length assigned by the Si-Windowlength parameter as set in SIB1. This avoids the above unintended consequence of restricting non-essential SIBs.

In various embodiments, each type of SIB may be configured to use different resource blocks within the band. For example, SIB1 and SIB2 may be broadcast using different, non-overlapping restricted ranges of allowable values for their corresponding broadcast characteristics. As described previously, the location of the resource blocks may be known or predictable, but not necessarily fixed.

In various embodiments, the modulation and coding scheme and number of resource blocks used for different SIB types may be determined substantially independently. For example, SIB2 may use a different modulation and coding scheme than SIB3. The modulation and coding scheme and number of resource blocks used for different SIB types may again be known or predictable.

It is noted that fixing or restricting the location of the PDSCH SIB data may generally reduce scheduling flexibility of the base station, which may impact overall scheduling efficiency. However, the magnitude of such impacts can be considered acceptable for at least some use cases and measures of performance.

In some embodiments, to reduce impediments to scheduling flexibility of the base station, more than one known or predictable location and/or time for transmission of the PDSCH SIB may be given. The terminal would then be configured to attempt coherent combining of the SIB from all the known or predictable locations and/or times. This may require additional processing by the terminal. However, unused processing capacity may be present when the terminal is in acquisition mode, which is considered likely when receiving SIBs.

In some embodiments, since the size of the SIB messages can vary from system to system (e.g. due to the size of the plmn-IdentityList), the number of PRBs used ($N_{PRB}$) and code rate matching (i.e. $I_{TBS}$) may vary. Such information may be required by the terminal in order to perform coherent combining There are several solutions to this problem. One solution is to restrict transmission of SIB1 so that it is performed in accordance with a small set of $I_{TBS}$ and $N_{PRB}$ options. The terminal may then be configured to perform blind decoding on the restricted set of options, that is by attempting to decode a plurality of the various options in order to discover which option was used. The SIB1 may then include a new information element indicating the $I_{TBS}$ and $N_{PRB}$ used in transmission of other SIBs such as SIB2.

Restricting the set of $I_{TBS}$ and $N_{PRB}$ for SIB1 may potentially increase system overhead. Since the variation in the size of the SIB1 is limited (e.g. SIB1 may be 1, 2, 3 or 4 Physical Resource Blocks (PRBs)), the coding rate may be fixed (e.g. $I_{TBS}=4$ or $I_{TBS}=5$). In some embodiments, at most one PRB is deemed to be overhead if the above three blind decoding options are used, for example due to the loss of rate matching due to fixing $I_{TBS}$.

An example overhead calculation follows. The use case carries the following conditions: SIB1 size is 300 bits; Normal UE's need SIB1 sent with $I_{TBS}=5$ for coverage; Low Coverage UE's need 100× repeats with $I_{TBS}=5$ and require decoding in 2 seconds. Using repetition, overhead may be calculated as follows: The 300 bit SIB1 is encoded with $I_{TBS}=5$ and used 4 PRBS; SIB1 is normally repeated every 20 ms which is 100 times in 2 seconds; To achieve coverage with repetition, the SIB1 would be repeated in a manner to allow combining an extra 100 times in 2 seconds; Thus the overhead is 100/100 or 100%. Using a scheduling restriction mechanism with $I_{TBS}$ fixed at 4, overhead may be calculated as follows: The 300 bit SIB1 is encoded with $I_{TBS}=4$ and uses 5 PRBs (1 more than $I_{TBS}=5$); Overhead is 1/4 PRBs=25% but better coverage is provided to all UEs, whether in low coverage areas or not.

In some embodiments, an LTE terminal's complexity and cost does not substantially increase due to this new SIB blind decoding, as long as the number of PRBs the terminal needs to process in order to perform the above-described blind SIB1 decoding does not exceed the terminal's normal PDSCH PRB decoding capability as required to meet the DL throughput requirements. For example, as described in 3GPP TS 36.306 "Technical Specification; 3rd Generation Partnership Project; Technical Specification Group Radio Access Network; Evolved Universal Terrestrial Radio Access (E-UTRA); User Equipment (UE) radio access capabilities," Release 11, V11.3.0, March 2013, a category one (CAT1) UE terminal is required by the standard to be able decode at least 13 PRBs every 1 ms or 260 PRB every 20 ms in order to achieve the required DL data rate of 10 Mbps. Thus, if the three blind decoding options are $N_{PRB}=1, 2,$ or 3, then the blind SIB decoding only requires an equivalent to 6 decodes every 20 ms which is less than the 260 PRBs every 20 ms required to satisfy the DL data rate for a CAT 1 UE. In other words, existing terminals should have sufficient capacity for such blind decoding. If eight blind SIB decoding options are used (e.g. $N_{PRB}=2, 3, 4, 5, 6, 8, 10$ and 12), then the blind SIB decoding may require 40 SIB decodes every 20 ms which is significantly less than the 260 decodes supported. The number of blind decoding options may be configured so that timely and effective blind decoding is possible given the terminal's computational capabilities, said configuration being performed by the base station in view of said computational capabilities.

Figure 3:
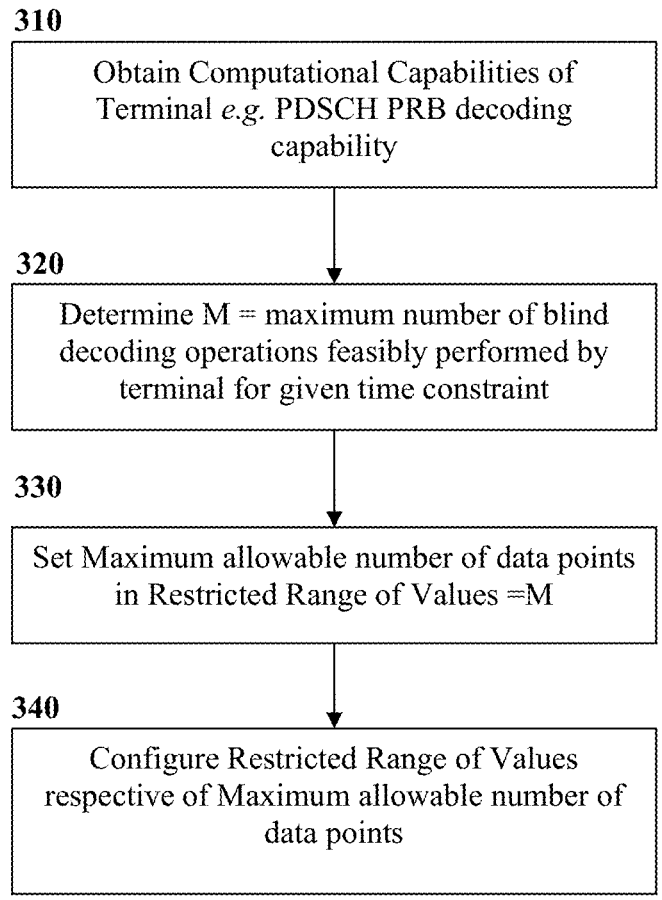
FIG. 3 illustrates operations for restricting the range of broadcast characteristic values in view of a terminal's capabilities, in accordance with embodiments of the present technology.

FIG. 3 illustrates operations for restricting the range of broadcast characteristic values in view of a terminal's capabilities, in accordance with embodiments of the present technology. The operations may be performed at the base station or associated infrastructure equipment. First, computational capabilities of a terminal, such as its PDSCH PRB decoding capability are obtained 310, either by querying the terminal, performing a database lookup of prior received information, or the like. Next, a maximum allowable number M of blind decoding operations which can be feasibly performed by a terminal, given its computational capabilities and other constraints such as time constraints, is determined 320. Next, the maximum allowable number of data points in the restricted range of values from which broadcast parameters are selected is set 330 to M. Finally, the restricted range of data points is configured 340 in view of the maximum number M of data points thereof.

In some embodiments, the maximum allowable number of data points may be set in consideration of the capabilities of multiple terminals. In this case, the maximum allowable number of data points may be set as the minimum of a plurality of maximum allowable numbers of data points, each of those maxima corresponding to a different terminal.

In some embodiments, restricting the range of values for at least some of the broadcast characteristics, such as restricting the location options for PRBs thereof and/or restricting the coding rate options thereof, may lead to additional system effects that may be managed. In particular, changing such location options and/or coding rate options may cause an increase in power consumption of UEs connected to the wireless network. For example, the current LTE specification requires that changes made to the MIB or SIBs generally triggers all UEs to re-acquire this information, which results in increased UE power consumption and other use of resources.

Therefore, some embodiments of the present invention are configured to address the above-identified additional system effects, such as the power consumption issue. In some such embodiments, the eNB may be configured to refrain from indicating changes to the MIB and/or SIBs to all UEs when only the PRB location thereof and/or the coding rate thereof has changed. As such, the general population of UEs would not be triggered to re-acquire MIB/SIB information, thereby reducing resource consumption.

In some embodiments, additional repetitions of broadcast messages, such as SIBs, may be deemed to be superfluous to the requirements of legacy UEs (or other classes of UEs), while also being deemed beneficial for other UEs. For example, such additional repetitions may result in a reduced SIB acquisition time for UEs, which may be beneficial in some instances. In this case, the present technology may be configured, for SIB messages deemed to be superfluous, to transmit those SIB's PDSCH portion but not the associated PDCCH messages, such as the associated scheduling information for the PDSCH portion. Rather, the target UEs may be configured to acquire the PDSCH portion using a priori scheduling knowledge as described elsewhere herein. In this way, the PDSCH portion may be repeated more frequently than the PDCCH portion, thereby conserving PDCCH resources. In addition, such an approach may be considered backward compatible with legacy UEs, since fixing or restricting the scheduling of SIB transmissions, associated PRB locations, coding rates, and the like, may be considered transparent to such legacy UEs. Additionally, transmitting the PDSCH portion of a broadcast message without transmitting its corresponding PDCCH portion may also be considered transparent to such legacy UEs. Transparency as stated above may relate to the observation that the legacy UEs may generally continue operating as before even when the above-identified variations to the standard are implemented.

Figure 5:
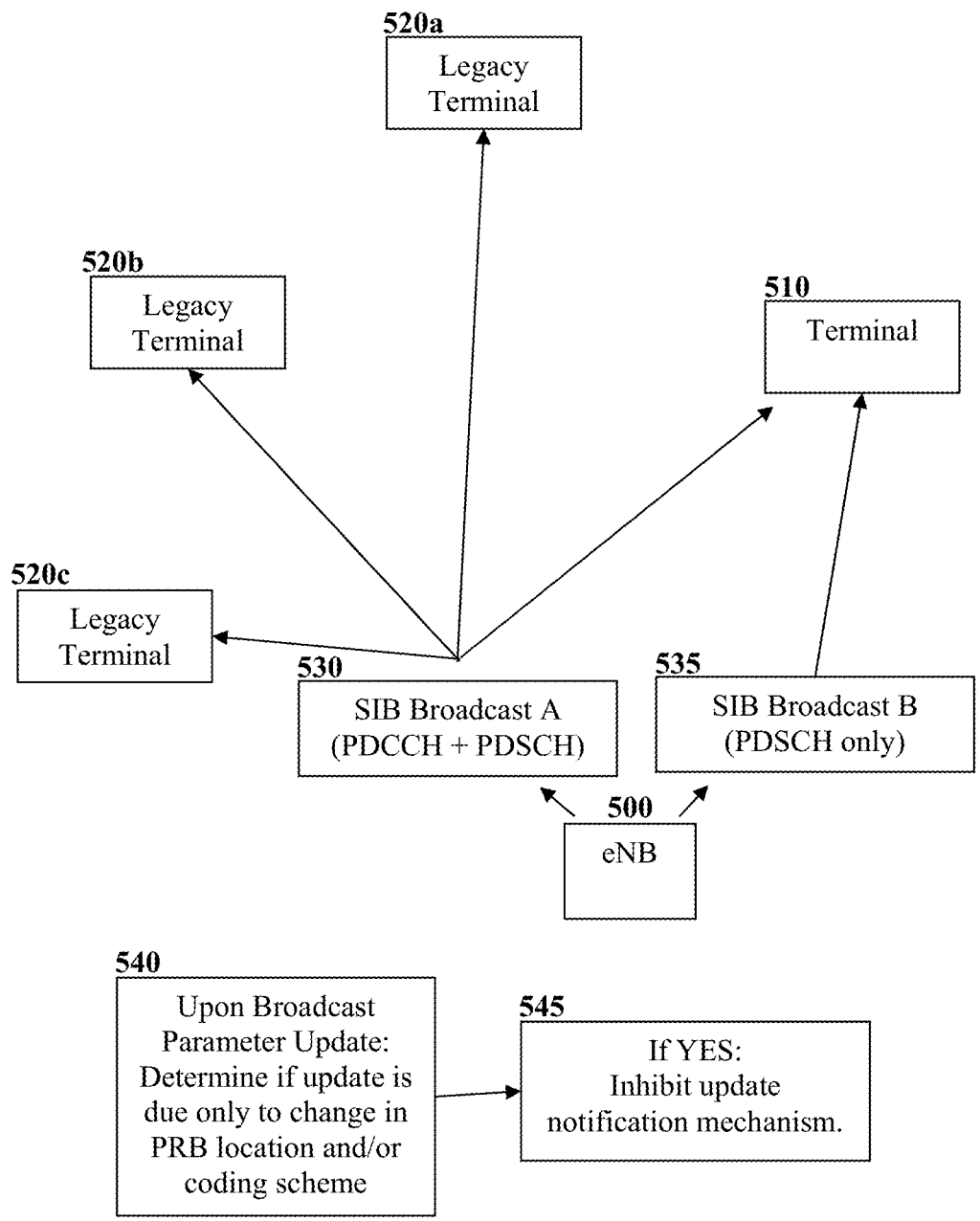
FIG. 5 illustrates operations of an eNB to reduce involvement of legacy terminals, in accordance with embodiments of the present technology.

FIG. 5 illustrates operations of an eNB 500 to reduce involvement of legacy terminals 520a, 520b, 520c, in accordance with embodiments of the present technology. As illustrated, SIB broadcasts by the eNB include SIB broadcasts of type A 530 and SIB broadcasts of type B 535. Type A broadcasts 530 are transmitted accordance to the current or legacy LTE standard, including transmission of data on both the PDCCH and PDSCH, and for receipt by the legacy terminals 520a, 520b, 520c, as well as the terminal 510. Type B broadcasts 535 exclude transmission of the PDCCH portion and thus are invisible to the legacy terminals 520a, 520b, 520c. However, the terminal 510 is configured with knowledge of the type B broadcast, as described elsewhere herein, and receives same.

Also illustrated in FIG. 5 is an operation of the eNB, in which, upon registering 540 a broadcast parameter update to be performed, determining whether or not the update is triggered only by a change in a location of PRBs used for transmitting an SIB and/or a change in coding scheme used for transmitting an SIB. If so, an update notification mechanism may be inhibited 545. Otherwise, the update notification mechanism operates, as in current or legacy versions of LTE, to notify terminals of an update to the broadcast parameters for communicating the SIB.

Combining SIBs at Terminal

Embodiments of the present technology comprise receiving multiple copies of repeated SIB messages at a wireless terminal, and coherently combining the multiple copies. This allows the terminals to accumulate the energy and/or information corresponding to the SIBs over time, since the SIB message content does not typically change frequently. Furthermore, restricted transmission of the SIBs facilitates this coherent combining.

As is known in the art, combining multiple copies of the same signal may facilitate an improved signal-to-noise ratio for the signal, since the signal components reinforce each other upon combining but the noise components typically do not reinforce each other. This aspect of the technology is similar to channel coding schemes such as repetition coding.

For example, to obtain about 20 dB of coverage improvement for a terminal in an LTE system, the terminal may be configured to receive and coherently combine about 100 copies of SIB1 as transmitted by the eNB. Since one copy of SIB1 is transmitted every 20 ms (using one of four different redundancy versions), this is expected to take about 2 seconds. This latency is acceptable for certain applications, particularly certain machine-to-machine applications.

In various embodiments, having known or predictable parameters for transmission of the SIBs facilitates combining of SIBs at the terminal, since the signal strength of a single given copy of a SIB may not be high enough for the terminal to adequately determine the content of the SIB or even adequately discriminate the symbols conveying the information. By having the terminal know or predict the SIB's transmission parameters, such as scheduling, number and location of resource blocks, modulation and coding scheme, and the like, the footprint of a SIB may be readily identified and the received radio signals within this footprint may be captured for subsequent combining In various embodiments, having consistent parameters for transmission of the SIBs facilitates combining of SIBs at the terminal, since plural SIBs are more readily combined when their characteristics match one another closely. In some embodiments, plural copies of a SIB may then be combined prior to processing of the content. Correspondingly placed symbols or bits of each SIB's copy may thus be used to reinforce each other without regard to the underlying meaning of these symbols or bits.

In various embodiments, as described elsewhere herein, the terminal may be configured to perform blind decoding when several broadcast parameters related to SIBs are possible but the exact value of the parameter set is not known with certainty. Blind decoding may generally comprise receiving and decoding wireless signals under a plurality of different assumptions regarding the value of the parameter set. As different assumptions are determined to be false, the corresponding data may be discarded. It is noted that one or more assumptions may be determined to be false upon discovering that a different assumption is determined to be true.

For example, in some embodiments, if blind SIB decoding is performed on the "number of PRBs" characteristic and the ranges of "number of PRBs" is 1, 2, or 3, (that is, the exact number of PRBs used by a SIB is unknown a priori but the range is known to be between one and three), then the terminal will maintain three SIB decoding candidates (one for each potential PRB length). For each sub-frame the SIB is known to be transmitted in, the terminal will coherently combine 1 PRB with the PRB length 1 candidate, coherently combine 2 PRBs with the PRB length 2 candidate, and coherently combine 3 PRBs with the PRB length 3 candidate. Then the UE will attempt to decode each of these candidates. If the CRC passes for a given candidate, this indicates that the candidate was successful and the blind SIB decoding process ends. If none pass, then the UE waits for the next sub-frame known to contain a SIB and coherently combines more SIBs PRBs to each of the three candidates.

Changing Content of SIBs

It is noted that content of a SIB may change over time, although likely at a low rate. If the content changes while a terminal is accumulating copies of a SIB for coherent combining, then the combination will likely not be successfully decoded, since the terminal will have acquired a mixture of two messages. In various situations, SIB content is configured to change only at specific intervals, for example only when the System Frame Number modulo N is equal to zero, where N is generally configurable. Such a System Frame is referred to herein as a boundary frame. In such situations, the SIB content will be fixed for at least N consecutive system frames. 3GPP TS 36.331, Section 5.2.1.3 defines this modification period for the current LTE standard.

In various embodiments, in view of the above, each terminal may be configured to avoid combining copies of a SIB from different sides of a boundary frame. However, this may be problematic when the modification period is too short, i.e. when N is smaller than the number of copies of a SIB required for adequate decoding. For example, the shortest modification period in LTE is about 64 radio frames, which may be too short, particularly considering that some SIBs may be sent only once during this modification period. Furthermore, the modification period is not known to the terminals until after they have received and decoded SIB2. Therefore, configuration of the terminals to avoid combining copies of SIB1 and SIB2 across a boundary frame may be problematic since the boundary frame in these cases may not yet be known.

In some embodiments, to address the above issues, the terminal may be configured to limit the number of copies of a SIB which are accumulated for coherent combination. This will tend to reduce the probability of combining across a boundary frame. The terminal may be configured to determine how many copies of a SIB are required based on estimates of its coverage, for example.

Apparatus

As mentioned above, the present technology may be implemented by a computer residing on a wireless terminal, a base station, or a combination thereof. Similarly, embodiments of the technology may comprise an apparatus configured to operate as described herein. In some embodiments, a base station, such as an eNB is provided, which is configured to broadcast system information as described herein. The base station may be configured in particular to restrict transmission of the broadcast system information in one or more ways, and may comprise a transmission restriction module to facilitate same. The transmission restriction module may comprise a computer or portion of a computer which restricts parameters used in broadcasting the system information in a predetermined manner. The base station may further comprise a scheduling module which is configured to schedule other transmissions around the broadcast system information, which is restricted.

In some embodiment, a terminal, such as a UE or machine-to-machine terminal, is provided, which is configured to receive and combine multiple broadcasts of system information, as described herein. The terminal may comprise an accumulation module which is configured to accumulate and combine multiple copies of the system information. The terminal may further comprise a prediction or tracking module, which is configured to track and/or predict aspects of the system information broadcasts, which are made to be known or predictable by the base station.

As will be readily understood, the various modules of the base station and terminal may be implemented using existing hardware, such as microprocessors, signal processors, or the like. The existing hardware may be adapted to carry out the functions as described herein via specially provided software or firmware, for example.

It will be appreciated that, although specific embodiments of the technology have been described herein for purposes of illustration, various modifications may be made without departing from the spirit and scope of the technology. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each step of the method may be executed on any computing device, such as a personal computer, mobile or handheld wireless device, M2M device, PDA, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

It is obvious that the foregoing embodiments of the technology are examples and can be varied in many ways. Such present or future variations are not to be regarded as a departure from the spirit and scope of the technology, and all such modifications as would be obvious to one skilled in the art are intended to be included within the scope of the following claims.

I claim:

1. A method for communicating system information from a base station to a terminal in a wireless network, the base station configured to repeatedly broadcast the system information in accordance with a predetermined standard, the standard defining a range of allowable values for at least one characteristic of the broadcast, said at least one characteristic of the broadcast selected from said range of allowable values, the method comprising:
   a) providing a restricted range of values for the at least one characteristic as a strict subset of the range of allowable values;
   b) for each repetition of the broadcast, selecting the at least one characteristic from the restricted range of values and transmitting said repetition of the broadcast in accordance with the at least one characteristic;
   c) providing an indication of the restricted range of values to the terminal;
   d) using said indication at the terminal to facilitate reception of a plurality of the repetitions of the broadcast; and
   e) combining the plurality of the repetitions at the terminal to facilitate recovery of the system information therefrom;
   wherein the predetermined standard is a version of a LTE standard, and wherein the broadcast system information corresponds to one or more System Information Blocks (SIBs); and
   wherein the wireless network comprises one or more legacy terminals in addition to the terminal, the method further comprising refraining from notifying said one or more legacy terminals of broadcast changes when said broadcast changes relate to one or both of location of physical resource blocks used for the broadcast, and coding scheme used for the broadcast.

2. The method according to claim 1, wherein the at least one characteristic corresponds to one or more of: timing of the broadcasts, broadcast radio frequency, size of broadcast, number of physical resource blocks used for the broadcast, location of physical resource blocks used for the broadcast, modulation scheme used for the broadcast, and coding scheme used for the broadcast.

3. The method according to claim 1, wherein the restricted range of values contains exactly one data point.

4. The method according to claim 1, wherein the restricted range of values contains a plurality of data points, wherein the terminal is configured to perform blind decoding on the transmission possibilities encompassed by the plurality of data points, and wherein the restricted range of values is sized to facilitate computational management of the blind decoding at the terminal, said terminal having given computational capabilities informing said sizing of the restricted range of values.

5. The method according to claim 1, wherein said indication of the restricted range of values facilitates reception of the plurality of the repetitions of the broadcast without requiring prior reception of scheduling information transmitted on a control channel and related to each broadcast.

6. The method according to claim 5, wherein the scheduling information is in the form of a DCI message transmitted on the PDCCH or the MIB transmitted on PBCH or SIB transmitted on PDSCH of an LTE wireless network.

7. The method according to claim 1, wherein the indication of the restricted range of values is provided a priori to the terminal.

8. The method according to claim 1, wherein the indication of the restricted range of values is transmitted to the terminal by one or more over the air messages.

9. The method according to claim 1, wherein different repetitions of the broadcast use different radio frequencies, the different radio frequencies being selected in a manner predictable to the terminal, thereby facilitating frequency diversity.

10. A computer program product comprising a non-transitory computer readable medium storing computer executable statements and instructions thereon that, when executed by a computer, perform operations for implementing the method of claim 1.

11. A base station for communicating system information to a terminal in a wireless network, the base station configured to broadcast the system information in accordance with a predetermined standard, the standard defining a range of allowable values for at least one characteristic of the broadcast, said at least one characteristic of the broadcast selected from said range of allowable values, the base station comprising:
    a) a system information broadcast restriction module configured to provide a restricted range of values for the at least one characteristic as a strict subset of the range of allowable values; and
    b) a system information broadcast module configured to repeatedly broadcast the system information, wherein, for each repetition of the broadcast, the at least one characteristic is selected from the restricted range of values and wherein each repetition of the broadcast is transmitted in accordance with the at least one characteristic,
  wherein an indication of the restricted range of values is provided to the terminal, the terminal configured to use said indication to facilitate reception of a plurality of the repetitions of the broadcast, the terminal further configured to combine the plurality of the repetitions to facilitate recovery of the system information therefrom;
  wherein the predetermined standard is a version of a LTE standard, and wherein the broadcast system information corresponds to one or more System Information Blocks (SIBs); and
  wherein the wireless network comprises one or more legacy terminals in addition to the terminal, the base station further configured to refrain from notifying said one or more legacy terminals of broadcast changes when said broadcast changes relate to one or both of location of physical resource blocks used for the broadcast, and coding scheme used for the broadcast.

12. The base station according to claim 11, wherein the at least one characteristic corresponds to one or more of: timing of the broadcasts, broadcast radio frequency, size of broadcast, number of physical resource blocks used for the broadcast, location of physical resource blocks used for the broadcast, modulation scheme used for the broadcast, and coding scheme used for the broadcast.

13. The base station according to claim 11, wherein the indication of the restricted values are transmitted to the terminal by one or more over the air messages.

* * * * *